US008754810B2

(12) United States Patent
Guo et al.

(10) Patent No.: US 8,754,810 B2
(45) Date of Patent: Jun. 17, 2014

(54) HYBRID ADAPTIVE ANTENNA ARRAY

(75) Inventors: Yingjie Jay Guo, Beecroft (AU); John David Bunton, St Clair (AU); Valeriy Dyadyuk, Cremorne (AU); Xiaojing Huang, North Ryde (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 358 days.

(21) Appl. No.: 13/147,359

(22) PCT Filed: Jan. 29, 2010

(86) PCT No.: PCT/AU2010/000091
§ 371 (c)(1),
(2), (4) Date: Oct. 17, 2011

(87) PCT Pub. No.: WO2010/085854
PCT Pub. Date: Aug. 5, 2010

(65) Prior Publication Data
US 2012/0033761 A1    Feb. 9, 2012

(30) Foreign Application Priority Data
Feb. 2, 2009    (AU) ................................ 2009900371

(51) Int. Cl.
*H01Q 3/00*    (2006.01)
(52) U.S. Cl.
USPC ............................ 342/368; 342/372; 342/373
(58) Field of Classification Search
CPC ...... H01Q 3/00; H01Q 3/2605; H01Q 3/2694
USPC ................... 342/81, 368, 372, 373, 442, 443; 375/316, 329
See application file for complete search history.

(56) References Cited

U.S. PATENT DOCUMENTS

| 4,780,721 A | 10/1988 | Dobson |
| 6,404,803 B1 | 6/2002 | Wang et al. |

(Continued)

FOREIGN PATENT DOCUMENTS

| CA | 2 555 106 A1 | 2/2007 |
| EP | 1 920 577 A | 3/2007 |

(Continued)

OTHER PUBLICATIONS

Viering et al., "Hybrid Beamforming: Reduced Eigen Beamforming on Beam Signals", . 2002 International Zurich Seminar on Broadband Communications Access, Transmission, Networking, pp. 9-1 to 9-6.

(Continued)

*Primary Examiner* — Dao Phan
(74) *Attorney, Agent, or Firm* — Kilpatrick Townsend & Stockton LLP (57) ABSTRACT

Disclosed is a hybrid antenna array (100) comprising a plurality of digital branches (145), each digital branch including an analogue beamforming sub-array (e.g. 110-1), each sub-array having a plurality of antenna elements (120), a phase shifter (130) adapted to apply a phase shift to the signal from each antenna element, and a combiner (e.g. 135-1) adapted to combine the phase-shifted signals. Each digital branch also includes a signal chain (e.g. 140-1) adapted to convert the output of the sub-array to baseband. The hybrid antenna array also comprises a digital processing module (150), including: an angle of arrival estimation sub-module (155) adapted to estimate an angle of arrival of a signal at the antenna elements; a phase control sub-module (170) adapted to control the phase shift applied by each phase shifter depending on the estimated angle of arrival; and a digital beamformer (165) adapted to combine the baseband signals from the digital branches using a weight vector to form an output signal (180).

10 Claims, 3 Drawing Sheets

(56) References Cited

U.S. PATENT DOCUMENTS

| | | | |
|---|---|---|---|
| 6,483,459 | B1 | 11/2002 | Hou et al. |
| 6,992,622 | B1* | 1/2006 | Chiang et al. ................. 342/374 |
| 7,183,974 | B1 | 2/2007 | Minkoff |
| 7,403,748 | B1 | 7/2008 | Keskitalo et al. |
| 7,414,578 | B1 | 8/2008 | Courtade et al. |
| 2003/0016173 | A1 | 1/2003 | Obayashi |
| 2003/0128160 | A1 | 7/2003 | Sim |
| 2004/0061644 | A1 | 4/2004 | Lier et al. |
| 2005/0070333 | A1 | 3/2005 | Doi |
| 2005/0110681 | A1 | 5/2005 | Londre |
| 2006/0181456 | A1 | 8/2006 | Dai |
| 2006/0192710 | A1 | 8/2006 | Schieblich et al. |
| 2007/0046538 | A1 | 3/2007 | Lin |
| 2007/0080888 | A1 | 4/2007 | Mohamadi |
| 2007/0093269 | A1 | 4/2007 | Leabman |
| 2007/0093274 | A1 | 4/2007 | Jafarkhani et al. |
| 2007/0249404 | A1 | 10/2007 | Gao et al. |
| 2007/0263748 | A1 | 11/2007 | Mesecher |
| 2008/0039146 | A1 | 2/2008 | Jin |
| 2008/0068266 | A1 | 3/2008 | DeAgro |
| 2008/0194204 | A1 | 8/2008 | Duet et al. |

FOREIGN PATENT DOCUMENTS

| | | |
|---|---|---|
| MX | PA03004316 A | 6/2005 |
| WO | WO 01/89030 A1 | 11/2001 |
| WO | WO 2004/083998 A2 | 9/2004 |
| WO | WO 2005/015771 A1 | 2/2005 |
| WO | WO 2006/132707 A2 | 12/2006 |
| WO | WO 2007/021891 A1 | 2/2007 |
| WO | WO 2007/095354 A2 | 8/2007 |
| WO | WO 2008/000119 A1 | 1/2008 |
| WO | WO 2008/051845 A2 | 5/2008 |
| WO | WO 2008/069415 A1 | 6/2008 |
| WO | WO 2008/087388 A1 | 7/2008 |
| WO | WO 2008/093040 A2 | 8/2008 |

OTHER PUBLICATIONS

Nishio et al., "Multiple-beam adaptive array architecture using channel-level FDMA concept", IEEE Antennas and Propagation Society International Symposium, Jun. 22-27, 2003, vol. 3, pp. 908-911.

Jwa et al., "Hybrid Beamforming in WCDMA Antenna Array System", 2004 IEEE 60th Vehicular Technology Conference, Sep. 26-29, 2004, vol. 1, pp. 252-255.

Rezk et al, "Narrow Beam Adaptive Array for Advanced Wireless Applications", 2005. IEEE/ACES International Conference on Wireless Communications and Applied Computational Electromagnetics, Apr. 3-7, 2005, pp. 594-597.

Celik et al., "Implementation and Experimental Verification of Hybrid Smart-Antenna Beamforming Algorithm", IEEE Antennas and Wireless Propagation Letters, Dec. 1, 2006, vol. 5, No. 1, pp. 280-293.

Celik et al., "Implementation and Experimental Verification of Hybrid Beamforming Algorithm", IEEE Antennas and Propagation Society International Symposium 2006, pp. 4221-4224.

Yeh et al., "Least-Squares Regenerative Hybrid Array for Adaptive Beamforming",IEEE Transactions on Antennas and Propagation, Apr. 4, 1990, vol. 38, No. 4, pp. 489-497.

Vitale et al, "Genetic Algorithm Assisted Adaptive Beamforning", Proceedings VTC 2002—Fall. 2002 IEEE 56th Vehicular Technology Conference, 2002, vol. 1, pp. 601-605.

Foutz et al. "Adaptiv Eigen-Projection Beamforming Algorithms for 1-D and 2-D Antenna Arrays", IEEE Antennas and Wireless Propagation Letters, 2003, vol. 2, pp. 62-65.

Tsai et al. "Performance Analysis of Adaptive Beamforming for OFDM-CDMA Systems in Ground-Based Communications", Conference Record of the Thirty-Seventh Asilomar Conference on Signals, Systems and Computers, Nov. 9-12, 2003, vol. 1, pp. 643-646.

Kogon, "Eigenvectors, Diagonal Loading and White Noise Gain Constraints for Robust Adaptive Beamforming", Conference Record of the Thirty-Seventh Asilomar Conference on Signals, Systems and Computers, Nov. 9-12, 2003, vol. 2, pp. 1853-1857.

Pan et al., "Adaptive Beamforming with Antenna Selection in MIMO Systems", VTC2004—Fall. 2004 IEEE 60th Vehicular Technology Conference, Sep. 26-29, 2004, vol. 3, pp. 1570-1574.

Chen et al., "Adaptive Antenna Arrays for Interference Cancellation in OFDM Communication Systems With Virtual Carriers", IEEE Transactions on Vehicular Technology, Jul. 2007, vol. 56, No. 4, pp. 1837-1844.

Lu et al., "A Smart Antenna Array for CDMA systems with Noncoherent M-ary Orthogonal Modulation", GLOBECOM '97., IEEE Global Telecommunications Conference, Nov. 3-8, 1997, vol. 2, pp. 589-593.

Hayward et al., "Adaptive Beamforming for Rapidly Moving Arrays", CIE International Conference of Radar, Oct. 8-10, 1996, pp. 480-483.

Nickel, "Subarray Configurations for Digital Beamforming with Low Sidelobes and Adaptive Interference Suppression", Record of the IEEE 1995 International Radar Conference, May 8-11, 1995, pp. 714-719.

Nickel, "Monopulse estimation with subarray-adaptive arrays and arbitrary sum and difference beams", IEE Proceedings Radar, Sonar and Navigation, Aug. 4, 1996, vol. 143, No. 4, pp. 232-238.

Qiu et al., "Antenna Subarray Division and Adaptive Beamforming", CIE International Conference of Radar, Oct. 8-10, 1996, pp. 484-487.

Smolko, "Optimization of Pattern Sidelobes in Arrays With Regular Subarray Architectures", IEEE Antennas and Propagation Society International Symposium, Jun. 21-26, 1998, vol. 2, pp. 756-759.

Tarran et al., "Wideband Phased Array Radar With Digital Adaptive Beamforming", IEE Colloquium High Resolution Radar and Sonar, 1999, pp. 1/1-1/7.

Hu et al., "Application of Weighting Methods Adapting to Array Structure for Design of DBF in Subarray", ICMMT 2002, 2002 3rd International Conference on Microwave and Millimeter Wave Technology, Aug. 17-19, 2002, pp. 697-700.

Huang et al., "A New Fast Adaptive Beamforming Method Based on LMS Algorithm", Asia-Pacific Conference Proceedings Microwave Conference, Dec. 4-7, 2005, 3 pages.

Cao et al, "Wideband Digital Beamforming When Using LFM waveform", 2005 IEEE International Symposium on Microwave, Antenna, Propagation and EMC Technologies for Wireless Communications Proceedings, Aug. 8-12, 2005, vol. 2, pp. 1275-1278.

Hu et al., "Study on ADBF Methods at Subarray Level", IEEE 2006 Antennas and Propagation Society International Symposium, pp. 3375-3378.

Hu et al., "An Effective ADBF Method at Subarray Level for Plane Phased Array", 2006 8th International Conference on Signal Processing, 2006, vol. 4, 4 pages.

Nickel, "Properties of Digital Beamforming with Subarrays", CIE '06. International Conference on Radar, Oct. 2006, 5 pages.

Hu et al., "Research on Subarray Partitioning of Planar Phased Array with Adaptive Digital Beamforming", IEEE 2007 International Symposium on Microwave, Antenna, Propagation, and EMC Technologies for Wireless Communications, Aug. 16-17, 2007, pp. 691-694.

Wang et al., "Grating Lobe Reduction in a Phased Array of Limited Scanning", IEEE Transactions on Antennas and Propagation, Jun. 2008, vol. 56, No. 6, pp. 1581-1586.

Hu et al., 2-D ADBF at Subarray Level with Pattern Control Based on Subspace Projection, CIE '06. International Conference on Radar, Oct. 2006, 4 pages.

Hu et al., "Analyses of Directivity Function Characteristics and Channel Mismatch Correction for DBF in Subarray", 2003. Proceedings. 2003 6th International Symposium on Antennas, Propagation and EM Theory, Oct. 28-Nov. 1, 2003, pp. 271-274.

Wang et al., "Subarray Adaptive Array Beamforming Algorithm Based on LCMV", C 2005. Asia-Pacific Conference Proceedings Microwave Conference Proceedings, Dec. 4-7, 2005, vol. 3, 3 pages.

Haupt, "Optimized Weighting of Uniform Subarrays of Unequal Sizes", IEEE Transactions on Antenna and Propagation, Apr. 2007, nol. 55, No. 4, 99. 1207-1210.

Tang et al., "Sub-array RLS Adaptive Algorithm", IEEE Electronics Letters, Jun. 24, 1999, vol. 35, No. 13, pp. 1061-1063, Jun. 24, 1999.

(56) References Cited

OTHER PUBLICATIONS

Jeon, Seong-Sik, et al., "A Novel Planar Array Smart Antenna System with Hybrid Analog-Digital Beamforming," IEEE, Department of Electrical Engineering, pp. 121-124 (2001).

Rezk, Meriam, et al, "Performance Comparison of a Novel Hybrid Smart Antenna Versus the Fully Adaptive and Switched Beam Antenna Arrays," IEEE Antennas and Wireless Propagation Letters, vol. 4, pp. 285-288, (2005).

Zhang, Zhijun, et al., "Hybrid Smart Antenna System Using Directional Elements—Performance Analysis in Flat Rayleigh Fading," IEEE Transactions on Antennas and Propagation, vol. 51, No. 10, pp. 2926-2935 (Oct. 2003).

Budsabathon, Montree, et al., "Optimum Beamforming for Pre-FFT OFDM Adaptive Antenna Array," IEEE Transactions on Vehicular Technology, vol. 53, No. 4, pp. 945-955 (Jul. 2004).

International Preliminary Report on Patentability and Written Opinion of the International Searching Authority—Aug. 2, 2011.

\* cited by examiner

HYBRID ADAPTIVE ANTENNA ARRAY

CROSS-REFERENCES TO RELATED APPLICATIONS

This application is a National Stage of International Application No. PCT/AU2010/000091 filed Jan. 29, 2010, and which claims the benefit of Australian Provisional Application No. 2009900371, filed Feb. 2, 2009, the disclosures of which are incorporated herein by reference.

TECHNICAL FIELD

The present invention relates generally to antenna design and, in particular, to architectures and methods for adaptive antenna arrays.

BACKGROUND

Adaptive antennas are important subsystems for long range, mobile and ad hoc wireless communications and sensing networks. The most powerful adaptive antenna architecture is the digital beamforming array, where each antenna element has an associated signal chain to convert the received signal from RF (radio frequency) to baseband, and the baseband signals are processed by a digital beamformer using adaptive filtering techniques. Digital beamforming antenna arrays have the capability of generating many antenna patterns simultaneously, performing high precision beamforming such as nulling, and producing output signals with the maximum signal to noise and interference ratio (SNIR). A further advantage of the digital beamforming array architecture is that on-line calibration of different branches can be handled automatically by the digital beamformer. However, purely digital beamforming antenna arrays do have a major disadvantage. Since the cost of processing digital data is proportional to the bandwidth and the computational power required for digital signal processing increases at least linearly with the number of elements, a large digitally beamformed antenna array for wideband operation is simply too costly and impractical for most applications. Another problem with digital beamforming arrays is that, due to the limitation of physical space defined by the array element spacing, a pure digital beamformer is impractical at millimeter-wave frequencies beyond approximately 55 GHz. The element spacing required for suppression of grating lobes at scan angles within 60 degrees is limited to 2.9 and 1.7 mm at operating frequencies of 55 and 95 GHz respectively, thus making it extremely difficult to physically place the signal chains behind the antenna elements.

The other principal adaptive array architecture is the analogue beamformer, in which "smart beams" are formed using RF or IF phase shifters on each antenna element in the array. In purely analogue systems, cost is a very weak function of bandwidth. Thus, for wideband adaptive antenna systems with a large number of elements, an analogue adaptive antenna array is much more economical than a purely digital adaptive array. However, an analogue beamformer has certain disadvantages. First, the calibration of a large analogue array is labour-intensive and on-line recalibration is extremely difficult. Second, special means must be employed for beam tracking, thus increasing the complexity and the cost. Third, there is no access to the baseband signals of individual analogue branches because the phase-shifted IF or RF signals are combined before conversion to baseband, so the capacity to form selective beam patterns is limited. These problems are particularly severe for large analogue arrays where the imperfection and ageing of components can cause serious degradation in antenna performance.

SUMMARY

Disclosed are arrangements which seek to ameliorate the above disadvantages by means of a hybrid adaptive antenna array, which comprises an array of antenna elements partitioned into multiple analogue beamforming sub-arrays and a digital beamformer on the sub-array outputs, with a control path back to the analogue phase shifters. This reduces the size of the digital beamformer by a factor equal to the average number of elements in each sub-array. Also disclosed are calibration methods for both the analogue and the digital beamformers in the hybrid adaptive array. In addition, disclosed are search and tracking methods for the hybrid adaptive array. The disclosed hybrid array provides an efficient means of producing large, high-gain adaptive antenna arrays at relatively low cost.

According to a first aspect of the present disclosure, there is provided a hybrid antenna array comprising:

(a) a plurality of digital branches, each digital branch including:
  (i) an analogue beamforming sub-array, each sub-array having a plurality of antenna elements, a phase shifter adapted to apply a phase shift to the signal from each antenna element, and a combiner adapted to combine the phase-shifted signals;
  (ii) a signal chain adapted to convert the output of the sub-array to baseband; and
(b) a digital processing module, including:
  (i) an angle of arrival estimation sub-module adapted to estimate an angle of arrival of a signal at the antenna elements;
  (ii) a phase control sub-module adapted to control the phase shift applied by each phase shifter depending on the estimated angle of arrival; and
  (iii) a digital beamformer adapted to combine the baseband signals from the digital branches using a weight vector to form an output signal.

According to a second aspect of the present disclosure, there is provided a method of estimating the angle of arrival of a signal at an antenna array comprising a plurality of digital branches and a digital beamformer, the method comprising:

(a) cross-correlating the baseband signals from adjacent digital branches;
(b) for a plurality of candidate beams,
  (i) setting the phase shifts using the arguments of the cross-correlation values; and
  (ii) computing the power of the output signal of the digital beamformer;
(c) determining the candidate beam giving the maximum output power; and
(d) estimating the angle of arrival from the cross-correlation values of the determined candidate beam.

According to a third aspect of the present disclosure, there is provided a method of calibrating an antenna array comprising a plurality of digital branches and a digital beamformer, the method comprising:

(a) estimating the expected phase difference between the baseband signals from adjacent digital branches;
(b) determining the phase deviation of each digital branch as the difference between the expected phase difference and an actual phase difference between the baseband signals from a digital branch and an adjacent previously calibrated digital branch; and (c) applying each phase deviation to the baseband signal from the corresponding digital branch.

According to a fourth aspect of the present disclosure, there is provided a method of calibrating an antenna array comprising a plurality of analogue branches, each analogue branch comprising an antenna element and a phase shifter, the method comprising:

(a) optimising the phase shifts applied by the phase shifters to an input signal to the array so as to obtain a maximum-power output signal from the array;

(b) determining expected values of the phase shifts using an angle of arrival of the input signal;

(c) determining the phase deviation for each analogue branch in the array as the difference between the expected phase shift and the optimised phase shift for the analogue branch; and (d) applying each phase deviation to adjust the phase shift applied by the corresponding phase shifter.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 1:
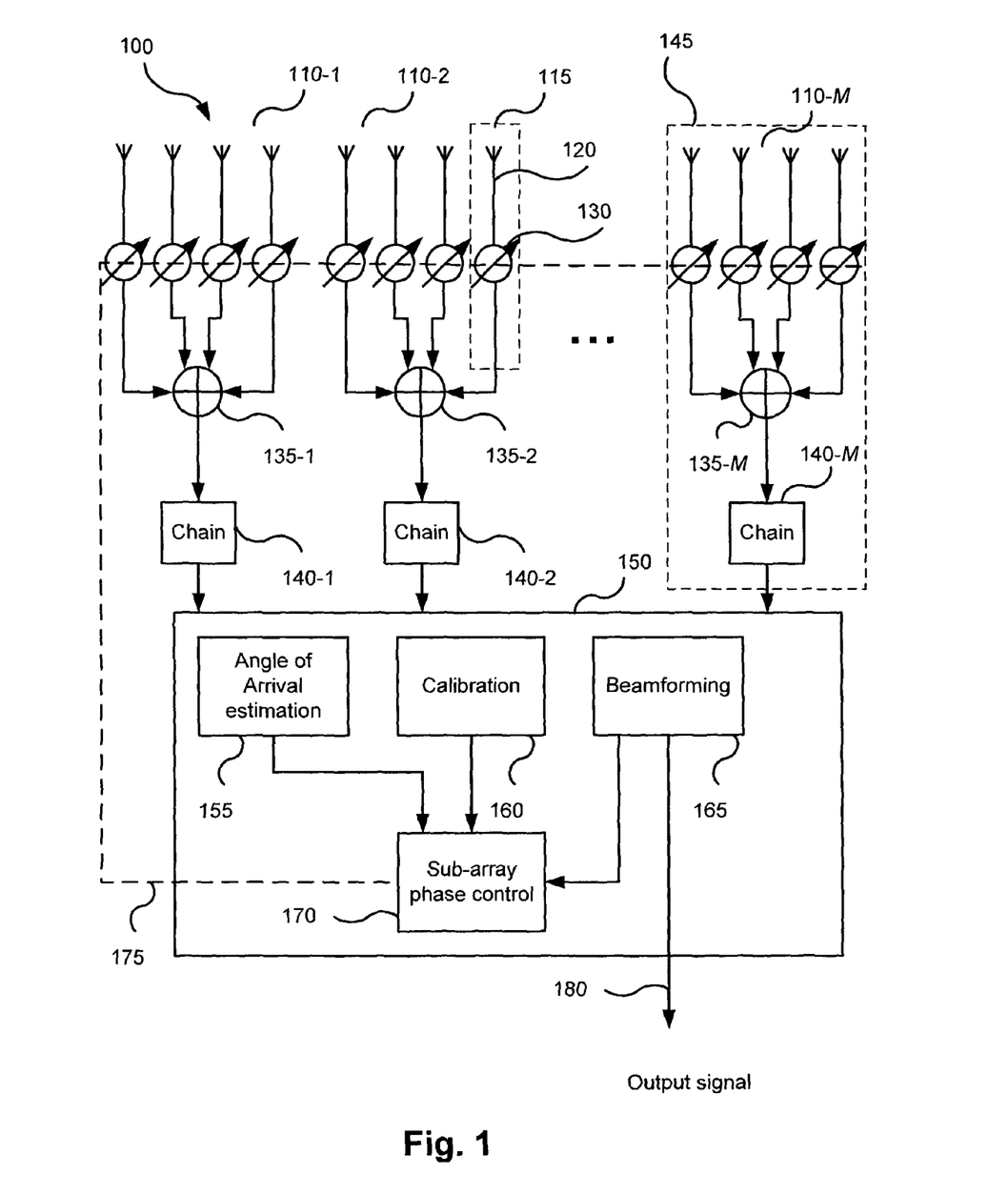
FIG. 1 shows a receiving hybrid antenna array according to one embodiment of the present invention.

FIG. 1 shows a receiving hybrid antenna array 100 according to one embodiment. The antenna elements, e.g. 120, in the array 100 are grouped into M analogue beamforming sub-arrays 110-1, 110-2, . . . , 110-M.

A hybrid array is said to have a planar configuration (a planar array) if all the sub-arrays are located in a single plane. A linear configuration (a linear array) is a special case of a planar configuration in which all the sub-arrays are located in a single line.

Figure 2A:
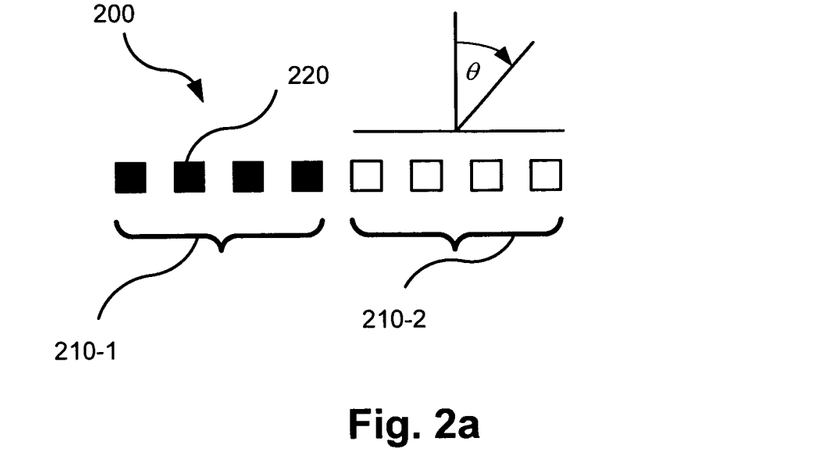
FIG. 2a shows an exemplary linear configuration of the hybrid array of FIG. 1.
Figure 2B:
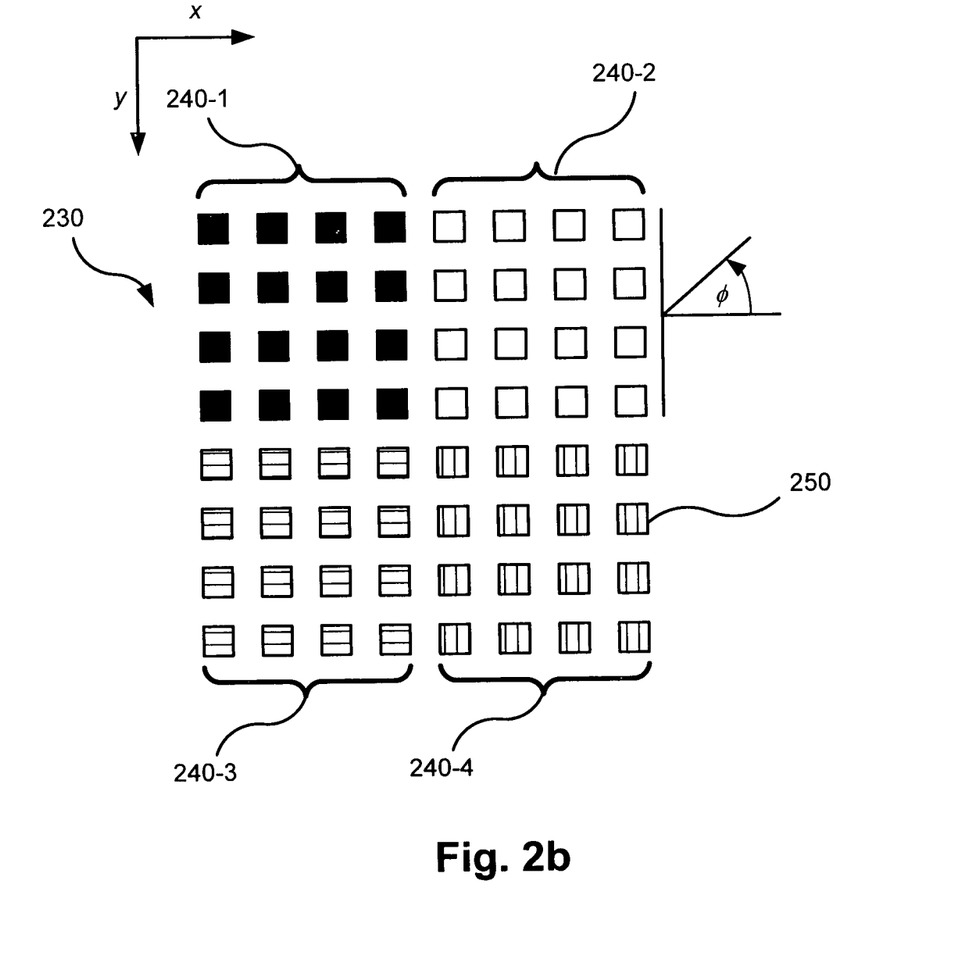
FIG. 2b shows an exemplary planar configuration of the hybrid array of FIG. 1.

FIG. 2a shows an exemplary linear configuration 200 of the hybrid antenna array 100 of FIG. 1. The exemplary linear array 200 comprises two sub-arrays 210-1 and 210-2 arranged side-by-side, each sub-array 210-m comprising four evenly-spaced elements, e.g. 220, arranged in a straight line. FIG. 2b shows an exemplary planar configuration 230 of the hybrid antenna array 100 of FIG. 1. The exemplary planar array 230 comprises sub-arrays 240-1, 240-2, 240-3, and 240-4 laid out in a square, each sub-array 240-m comprising a four-by-four square grid of elements, e.g. 250. The hatching of each element 250 indicates the sub-array to which it belongs.

Each sub-array 110-m in FIG. 1 is illustrated with 4 elements 120, which is the preferred sub-array size for a linear array, while the preferred sub-array size for a planar array is 4 by 4 elements. In general, different sub-arrays may have different numbers of elements.

A planar array is defined as uniformly spaced if the number M of sub-arrays can expressed as $M=M_x \times M_y$, where $M_x$ and $M_y$ are the numbers of sub-arrays arranged along the x-axis and the y-axis respectively. The i-th element in sub-array m of a uniformly spaced planar array is located at coordinates ($X_{i,m}$, $Y_{i,m}$) such that $$X_{i,m}=X_i+m_x d_x^{(s)}, m_x=0,1,\ldots M_x-1$$

$$Y_{i,m}=Y_i+m_y d_y^{(s)}, m_y=0,1,\ldots M_y-1$$

where $m=m_y M_x+m_x$, $d_x^{(s)}$ and $d_y^{(s)}$ are the horizontal and vertical spacings of the sub-arrays respectively, and ($X_i$, $Y_i$) is the location of the i-th element of the sub-array numbered m=0. For example, the planar array 230 is uniformly spaced with $M_x=M_y=2$ and $d_x^{(s)}=d_y^{(s)}$.

A uniformly spaced linear array is a special case of a uniformly spaced planar array with $M_y=1$, so $M_x=M$, $m_y=0$, and $Y_{i,m}=Y_i$ ($d_y^{(s)}$ is irrelevant). For example, the linear array 200 is uniformly spaced with $M_x=2$ and $M_y=1$.

A rectangular sub-array has $N=N_x \times N_y$ elements, where $N_x$ and $N_y$ are the numbers of elements arranged along the x-axis and the y-axis respectively. The location ($X_i$, $Y_i$) of the i-th element of the rectangular sub-array numbered m=0 is given by $$X_i=X_0+i_x d_x^{(e)}, i_x=0,1,\ldots N_x-1$$

$$Y_i=Y_0+i_y d_y^{(e)}, i_y=0,1,\ldots N_y-1$$

where $i=i_y N_x+i_x$, $d_y^{(e)}$ and $d_x^{(e)}$ are the element spacings along the y-axis and x-axis respectively, and ($X_0$, $Y_0$) is the location of the element numbered 0. For example, each sub-array 240-m in the planar array 230 is rectangular, with $N_x=N_y=4$ and $d_x^{(e)}=d_y^{(e)}$.

A linear sub-array is a special case of a rectangular sub-array with $N_y=1$, so $N_x=N$, $i_y=0$, and $Y_i=Y_0$ for all i ($d_y^{(e)}$ is irrelevant). For example, each sub-array 210-m in the linear array 200 is linear, with $N_x=4$.

The planar array 230 is a uniformly spaced planar array comprising rectangular sub-arrays with $d_x^{(s)}=N_x d_x^{(e)}$ and $d_y^{(s)}=N_y d_y^{(e)}$. The linear array 200 is also uniformly spaced, comprising linear sub-arrays with $d_x^{(s)}=N_x d_x^{(e)}$.

Each antenna element 120 belongs to an analogue signal branch, e.g. 115, which also includes a phase shifter, e.g. 130, which is independently controllable by an external signal 175, as described below. The phase shifter 130 alters the phase of the received signal from the antenna element 120 by a controllable amount. Each analogue branch 115 may also contain a low noise amplifier, an attenuator, a filter, and a frequency down-converter, using a local oscillator, to intermediate frequency (not shown). The phase shifter 130 is preferably implemented as a controllable or 'switched' delay in the radio frequency (RF) signal, the down-converted intermediate frequency (IF) signal, or the local oscillator.

The outputs of each analogue branch 115 in the sub-array 110-m are combined by a combiner 135-m. The phases of each phase shifter 130 are controlled as described below such that each sub-array 110-m generates a beam in a desired direction, for example the angle of arrival of the RF signal incident on the hybrid array 100. The combination of RF signals from different analogue branches by the combiner 135-m is preferably implemented by a conventional corporate network.

In alternative embodiments, the analogue beamforming in a sub-array 110-m is performed by a Rotman lens or a Butler matrix rather than a phased array as described above.

The output of each sub-array 110-m is passed to a chain 140-m, which converts the RF or IF signal to baseband. The combination, e.g. 145, of a sub-array 110-m and a chain 140-m is referred to herein as a "digital branch". The M baseband signals from the digital branches 145 are processed in a digital processing module 150 comprising several sub-modules: a digital beamformer 165, a calibration sub-module 160, an angle of arrival estimation sub-module 155, and a sub-array phase control sub-module 170. The operation of each sub-module will be described below.

The digital processing module 150 serves several purposes. First, the digital beamformer 165 ensures that the output signal 180 of the hybrid array 100 has a highest signal to noise and interference ratio (SNIR). Second, the digital processing module 150, through the sub-array phase control sub-module 170, provides the control signal 175 for each phase shifter 130 in each sub-array 110-$m$. The angle of arrival estimation sub-module 155 plays a role in this function, as described below. Third, the digital processing module 150, through the calibration sub-module 160, provides calibration both for the digital branches 145 and for each analogue branch 115 in the hybrid array 100 as described below. The preferred implementations for the digital signal processing module 150 are embedded firmware on Field Programmable Gate Arrays (FPGAs) or a dedicated ASIC, which is more suitable for mass production.

The digital beamformer 165 generates an output signal z(n) 180 at time n by applying weights $w(n)=[w_0(n)\ w_1(n) \ldots w_{M-1}(n)]^T$ to the (complex-valued) baseband signal vector $x(n)=[x_0(n)\ x_1(n) \ldots x_{M-1}(n)]^T$ output by the digital branches 145 as follows:

$$z(n)=w^H(n)x(n) \quad (1)$$

where $^H$ indicates the conjugate transpose of a vector.

Forming the Digital Beam

The weights w(n) vary or adapt with time to cope with changing signal and/or system characteristics. There are a number of adaptive algorithms such as the least mean squares (LMS) algorithm and the recursive least squares (RLS) algorithm which can be employed to update the weight vector in a conventional digital beamformer. The method used by the digital beamformer 165 according to one embodiment uses a reference signal s(n) that was known to have been transmitted to arrive at time n. This knowledge is available during a training period for the hybrid array 100. The reference signal could be the header portion of a data packet. According to this embodiment, the digital beamformer 165 iteratively adjusts the weight vector as follows:

$$w(n)=\alpha w(n-1)+(1-\alpha)s^*(n)x(n) \quad (2)$$

where $\alpha$ is a "forgetting factor" that controls the effective window size of the time averaging, and the * superscript indicates complex conjugation.

In an alternative embodiment, to reduce the sensitivity of the digital beamformer 165 to the magnitude of the input signal vector x(n), the input signal vector x(n) is normalized, resulting in the following iterative adjustment equation:

$$w(n) = \alpha w(n-1) + (1-\alpha)s^*(n)\frac{x(n)}{\|x(n)\|^2} \quad (3)$$

For slow moving targets, the weights w can be fixed after the training period until the next training period (periodic adaptation). For fast moving target, after the training period, the output signal z(n) can be used as the reference signal s(n) (known as decision-aided beamforming).

Estimating the Angle of Arrival from the Weights

If the sub-arrays 110-$m$ in the hybrid array 100 are uniformly spaced in a linear configuration (e.g. 200), the weights will converge to the following form:

$$w_m(n)=\exp(jkmd_x^{(s)}\sin\theta)+v_m(n) \quad (4)$$

where k is the wavenumber of the RF carrier signal, $\theta$ is the "zenith" angle of arrival as illustrated in FIG. 2a, and v(n) is a noise vector.

If the sub-arrays 110-$m$ in the hybrid array 100 are uniformly spaced in a planar configuration (e.g. 230), the weights will converge to the following form:

$$w_m(n)=\exp(jk(m_x d_x^{(s)}\sin\theta\cos\phi+m_y d_y^{(s)}\sin\theta\sin\phi))+v_m(n) \quad (5)$$

where $\phi$ is the "azimuth" angle of arrival as illustrated in FIG. 2b. Note that for a planar array, the "zenith" angle of arrival $\theta$ is measured from the normal to the plane of the array.

Once the digital beamformer 165 converges, the angle of arrival estimation sub-module 155 analyses the weights w(n) according to the model in equation (4) or equation (5) to form an estimate $(\hat{\theta},\hat{\phi})$ of the angle of arrival, given values for k, $d_x^{(s)}$ and $d_y^{(s)}$.

Search Strategies

If the angle of arrival is not initially known, the phase shifters 130 cannot be set to the correct values to give each sub-array 110-$m$ anything like its maximum gain. The digital beamformer 165 may therefore be unable to form a reasonable beam, and thus the angle of arrival cannot be estimated by the sub-module 155 by the method described above.

To form a coarse estimate of the angle of arrival, and thereby initialise the hybrid array 100, the digital processing module 150 takes one of several approaches (known as the "search strategy"). One search strategy is to divide the whole hybrid array 100 into multiple groups. The sub-array phase control sub-module 170 sets the phase shifters 130 in the analogue sub-arrays 110-$m$ using equation (19) or (20) below, such that each group monitors a different "look angle" spanning the field of view. The digital processing module 150 operates on the outputs from each separate group in sequence, keeping the phase shifters 130 fixed. The "look angle" monitored by the group that results in the highest-power output signal z(n) is a coarse estimate of the angle of arrival. The reduced digital beamforming gain caused by the use of fewer than M sub-arrays at a time can be compensated for by a longer convergence time in the beamforming module 165.

Another search strategy is for the digital processing module 150 to perform a coarse digital beamforming using only one element 120 in each analogue beamforming sub-array 110-$m$, making the phase of each element irrelevant. An equivalent approach is to set the initial phases of each analogue sub-array such that the beam pattern of the sub-array has low directivity (i.e. is close to omni-directional). A coarse estimate of the angle of arrival may be then obtained using the method described above.

A third search strategy is for the sub-array phase control sub-module 170 to set all the phase shifters 130 in all the sub-arrays 110-$m$ so as to monitor a particular "look angle" using equation (19) or (20) below. The digital processing module 150 then estimates the angle of arrival using either of the methods described herein, and also records the corresponding output signal power. This process is repeated while the "look angle" is stepped through multiple look angles that cover the field of view. At the end of the search, the coarse estimate of the angle of arrival is the angle estimate corresponding to the highest output signal power.

All the search strategies are executed by the sub-array phase control sub-module 170 in collaboration with the beamforming module 165.

Estimating the Angle of Arrival by Correlation

An alternative method of estimating the angle of arrival is for the estimation sub-module 155 to cross-correlate the signals $x_m(n)$ from adjacent digital branches 145 along the x-axis and the y-axis:

$$R_x = E\{x_{m_y M_x + m_x}^*(n) x_{m_y M_x + m_x + 1}(n)\} \tag{6}$$

$$R_y = E\{x_{m_y M_x + m_x}^*(n) x_{(m_y + 1) M_x + m_x}(n)\} \tag{7}$$

Defining $$u_x = \frac{2\pi}{\lambda_c} d_x^{(s)} \sin\theta \cos\phi \tag{8}$$

$$u_y = \frac{2\pi}{\lambda_c} d_y^{(s)} \sin\theta \sin\phi \tag{9}$$

where $\lambda_c$ is the wavelength of the RF carrier signal, then provided $d_x^{(s)}$ and $d_y^{(s)}$ are less than or equal to $\lambda_c/2$, $u_x$ and $u_y$ will be in the range $(-\pi, \pi)$ and are equal to $\arg\{R_x\}$ and $\arg\{R_y\}$ respectively without any ambiguity. The angle of arrival could then be estimated directly from $u_x$ and $u_y$, given values for $\lambda_c$, $d_x^{(s)}$ and $d_y^{(s)}$.

However, for a uniformly spaced planar configuration, $d_x^{(s)}$ and $d_y^{(s)}$ are typically greater than $\lambda_c/2$, so $u_x$ and $u_y$ can be outside the range $(-\pi, \pi)$ and phase ambiguity will be present in $R_x$ and $R_y$.

Figure 3:
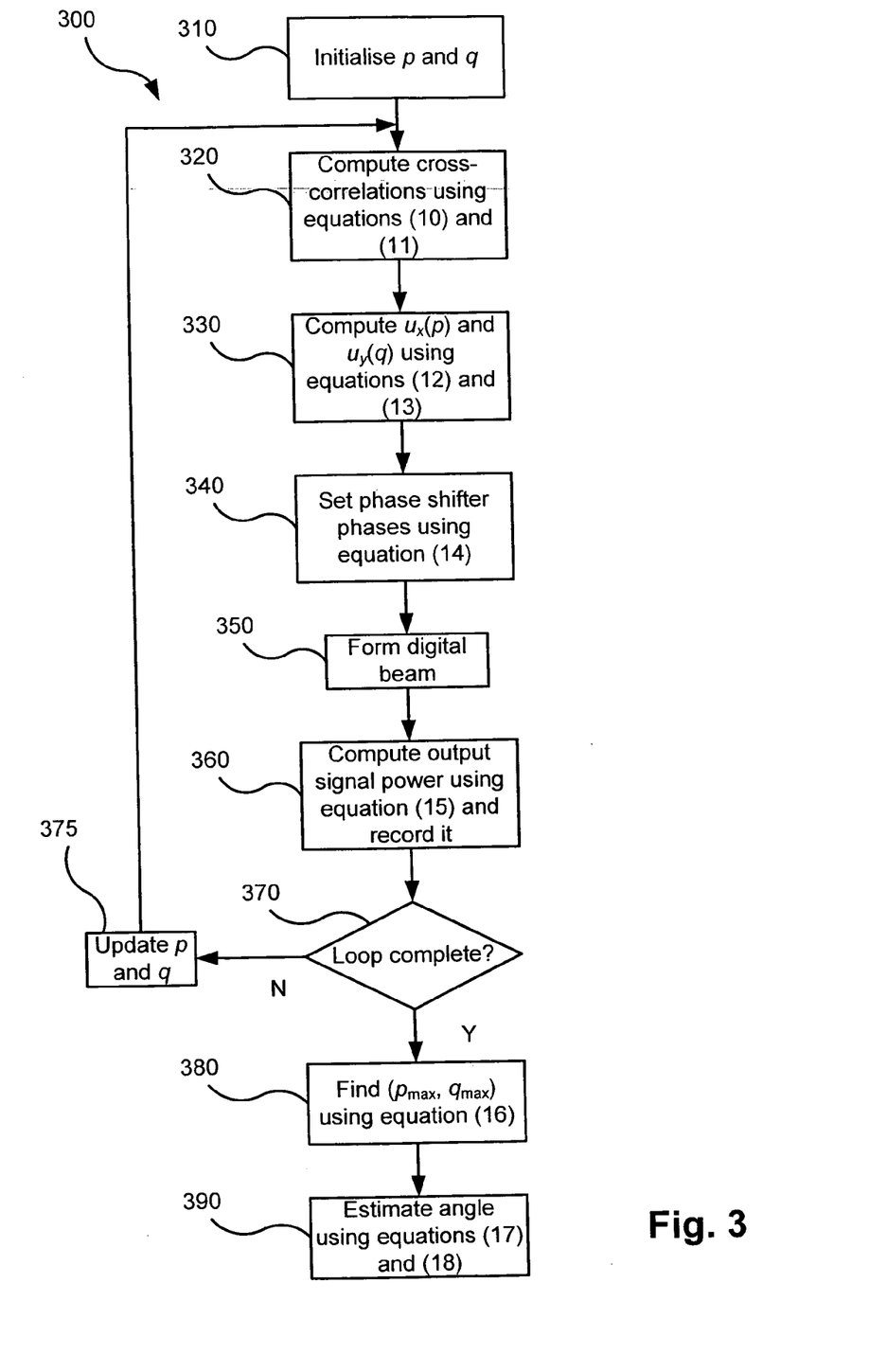
FIG. 3 is a flowchart illustrating a method of estimating the angle of arrival carried out by the hybrid antenna array of FIG. 1.

To handle this ambiguity, the estimation sub-module 155 carries out the method 300 illustrated in the flow chart in FIG. 3 to estimate the angle of arrival. In step 310, the estimation sub-module 155 initialises two indices p and q for a double loop over the following ranges:

$$p = -\left[\frac{N_x}{2}\right], -\left[\frac{N_x}{2}\right] + 1, \ldots, 0, 1, \ldots \left[\frac{N_x}{2}\right]$$

$$q = -\left[\frac{N_y}{2}\right], -\left[\frac{N_y}{2}\right] + 1, \ldots, 0, 1, \ldots \left[\frac{N_y}{2}\right]$$

In step 320, the estimation sub-module 155 estimates the cross-correlations iteratively over time n using all available sub-array outputs (to maximise the signal-to-noise ratio) as follows:

$$R_x^{(n)} = (1-\mu) R_x^{(n-1)} + \mu \sum_{m_y=0}^{M_y-1} \sum_{m_x=0}^{M_x-2} x_{m_y M_x + m_x}^*(n) x_{m_y M_x + m_x + 1}(n) \tag{10}$$

$$R_y^{(n)} = (1-\mu) R_y^{(n-1)} + \mu \sum_{m_x=0}^{M_x-1} \sum_{m_y=0}^{M_y-2} x_{m_y M_x + m_x}^*(n) x_{(m_y+1) M_x + m_x}(n) \tag{11}$$

where $0 < \mu < 1$ is an updating coefficient (typically set to 0.001).

The estimation sub-module 155 then at step 330 computes $u_x$ and $u_y$ values from $\arg\{R_x\}$ and $\arg\{R_y\}$ at the current p and q respectively, as follows:

$$u_x(p) = 2\pi p + \arg\{R_x\}, \tag{12}$$

$$u_y(q) = 2\pi q + \arg\{R_y\}, \tag{13}$$

where [.] denotes the operation of taking the integer part of a value.

Each pair $(u_x(p), u_y(q))$ represents a candidate beam. The phase control sub-module 170 at step 340 sets the phase shifts of the phase shifters 130 within each sub-array for the current (p, q) pair to $$\alpha_i(p,q) = -\frac{X_i u_x(p)}{d_x^{(s)}} - \frac{Y_i u_y(q)}{d_y^{(s)}} \tag{14}$$

The beamforming sub-module 165 then at step 350 forms the beam as described above to produce the output signal $z_{p,q}(n)$, after which (at step 360) the estimation sub-module 155 computes and records the output signal power for the current (p, q) pair iteratively as $$P^{(n)}(p,q) = (1-\beta) P^{(n+1)}(p,q) + \beta |z_{p,q}(n)|^2 \tag{15}$$

where $0 < \beta < 1$ is an updating coefficient (typically set to 0.25).

The estimation sub-module 155 then at step 370 determines whether the double loop over p and q is complete; if not, p and q are updated at step 375 and the method 300 returns to step 320.

If the double loop is complete, the estimation sub-module 155 at step 380 determines the (p, q) pair that yielded the largest output signal power computed at step 360:

$$(p_{max}, q_{max}) = \arg\max_{p,q} P^{(n)}(p,q) \tag{16}$$

Finally, at step 390 the estimation sub-module 155 uses the maximising pair $(p_{max}, q_{max})$ to estimate the angle of arrival:

$$\hat{\theta} = \text{sgn}(u_x(p_{max})) \sin^{-1}\left(\frac{\lambda_c}{2\pi} \sqrt{\frac{u_x(p_{max})^2}{(d_x^{(s)})^2} + \frac{u_y(q_{max})^2}{(d_y^{(s)})^2}}\right) \tag{17}$$

$$\hat{\phi} = \tan^{-1}\left(\frac{u_y(p_{max})}{u_x(q_{max})} \cdot \frac{d_x^{(s)}}{d_y^{(s)}}\right) \tag{18}$$

Due to the delay from the time when the phase shifts are loaded into the phase shifters 130 in sub-arrays 110-m to the time when a change of the beamformed output signal is observed, several (typically 4) iterations per (p, q) pair are preferable for step 360. If the number of iterations for each (p, q) pair is chosen so that the output power $P^{(n)}(p,q)$ of the corresponding beam can be calculated with sufficient accuracy, one pass through the complete double loop will be sufficient to determine the most likely beam and hence estimate the angle of arrival. If fewer than that number of iterations are used, the double loop is repeated until the power of each beam calculated across multiple double loops is obtained with sufficient accuracy.

Setting the Phase of the Analogue Branches

The sub-array phase control sub-module 170 uses the estimated angle of arrival $(\hat{\theta}, \hat{\phi})$ from the estimation sub-module 155 to set the phase of each phase shifter 130 in each analogue branch 115 via the control signals 175 as follows:

$$\alpha_i = -k(X_i \sin\hat{\theta} \cos\hat{\phi} + Y_i \sin\hat{\theta} \sin\hat{\phi}) \tag{19}$$

for the planar array, or $$\alpha_i = -k X_i \sin\hat{\theta} \tag{20}$$

for the linear array.

In tracking mode, the sub-array phase control sub-module 170 periodically obtains an estimate of $u_x(p_{max})$ and $u_y(q_{max})$ from the estimation module 155 (which uses steps 320 and 330 of the method 300 with (p, q) set to ($p_{max}$, $q_{max}$)), and updates the phase of each phase shifter 130 using equation (14), as in step 340 of the method 300.

Calibrating the Array

Equations (4) and (5) hold if the sub-arrays 110-$m$ are uniformly spaced and the signal chains 140-$m$ are identical. In practice, there will be small deviations from uniform spacing, and imperfections due to component un-uniformity, temperature change, and component ageing in the signal chains 140-$m$, which cause the weight vector to converge to values whose phase deviates slightly from the models in Equations (4) and (5). If these deviations are not corrected by calibration, the estimation of angle of arrival may be affected and the performance of the hybrid array 100 may be sub-optimal.

If the sub-arrays 110-$m$ are uniformly spaced, the phases between the signals output from any two adjacent digital branches 145 should have the same difference regardless of the phase deviation. This fact can be used to calibrate the digital branches. The calibration sub-module 160 analyses the signals $x_m(n)$ from each digital branch 145 to determine the phase deviation of each digital branch 145. To do this, the calibration sub-module 160 uses the method 300 to obtain an estimate of the "expected" phase difference, defined by equations (8) and (9), between any two adjacent digital branches 145. This estimate is then used to determine the phase deviation in each digital branch 145 as the difference between the expected phase difference and the actual phase difference between that digital branch 145 and an adjacent, previously calibrated digital branch. The calibration proceeds by induction in each direction from a designated reference digital branch. The phase deviation is used by the beamforming sub-module 165 to correct the signals $x_i(n)$ before forming the beam.

The calibration sub-module 160 also calibrates each analogue branch 115. According to one embodiment, the sub-array phase control sub-module 170 optimises the phase shifts applied by the phase shifters 130 in a sub-array 110-$m$ in order to obtain the maximum-power output signal $x_m(n)$ from the corresponding digital branch 145. Since the angle of arrival is known from the angle of arrival estimation sub-module 155, the expected phase shift values, accurate to the last bit of the phase shifters, can be calculated from equations (19) and (20). The difference between the expected phase shift values and the optimised phase shift values gives the phase deviation for each analogue signal branch. The deviation is applied by the phase control sub-module 170 to adjust the phase shifts of the phase shifters 130 in the sub-array. Calibration of analogue signal branches is preferably performed a few times a day.

The arrangements described are applicable to the data communication and sensing industries, and particularly to satellite communication and other high data rate communication (mobile, point-to-point, and point-to-multipoint topologies). The disclosed arrangements are most beneficial for millimeter-wave to terahertz adaptive antenna arrays where tight element spacing makes it very difficult or impossible to do conventional digital or analogue beamforming alone. The typical operating range is 10 to 100 GHz, but the arrangements are useful for frequencies as low as 400 MHz.

The foregoing describes only some embodiments of the present invention, and modifications and/or changes can be made thereto without departing from the scope and spirit of the invention, the embodiments being illustrative and not restrictive.

The invention claimed is:

1. A hybrid antenna array comprising:
(a) a plurality of digital branches, each digital branch including:
  (i) an analogue beamforming sub-array, each sub-array having a plurality of antenna elements, a phase shifter adapted to apply a phase shift to the signal from each antenna element, and a combiner adapted to combine the phase shifted signals;
  (ii) a signal chain adapted to convert the output of the sub-array to baseband;
(b) a digital processing module, including:
  (i) an angle of arrival estimation sub-module adapted to estimate an angle of arrival of a signal at the antenna elements;
  (ii) a phase control sub-module adapted to control the phase shift applied by each phase shifter depending on the estimated angle of arrival; and
  (iii) a digital beamformer adapted to combine the baseband signals from the digital branches using a weight vector to form an output signal.

2. The array according to claim 1, wherein the digital beamformer is adapted to compute the weight vector from the baseband signals.

3. The array according to claim 1, wherein the digital beamformer is adapted to compute the weight vector from the normalised baseband signals.

4. The array according to claim 2, wherein the digital beamformer is further adapted to compute the weight vector from a reference signal.

5. The array according to claim 1, wherein the digital processing module is adapted to estimate the angle of arrival by:
(a) cross-correlating the baseband signals from adjacent digital branches;
(b) for a plurality of candidate beams,
  (i) setting the phase shifts using the arguments of the cross-correlation values; and
  (ii) computing the power of the output signal of the digital beamformer;
(c) determining the candidate beam giving the maximum output power; and
(d) estimating the angle of arrival from the cross-correlation values of the determined candidate beam.

6. The array according to claim 1, wherein the digital processing module further comprises a calibration sub-module adapted to calibrate the digital beamformer by:
(a) estimating the expected phase difference between the baseband signals from adjacent digital branches;
(b) determining the phase deviation of each digital branch as the difference between the expected phase difference and an actual phase difference between the baseband signals from the digital branch and an adjacent previously calibrated digital branch; and
(c) applying the determined phase deviation to the baseband signal from the corresponding digital branch.

7. The array according to claim 1, wherein the digital processing module further comprises a calibration sub-module adapted to calibrate each analogue beamforming sub-array by:
(a) optimising the phase shifts applied by the phase shifters in the sub-array so as to obtain a maximum-power signal from the sub-array;
(b) determining the phase deviation for each analogue branch in the sub-array as the difference between the phase shift provided by the phase control sub-module and the optimised phase shift for the analogue branch; and (c) applying each phase deviation to adjust the phase shift applied by the corresponding phase shifter.

8. The array according to claim 1, wherein the sub-arrays are in a planar configuration.

9. The array according to claim 8, wherein each sub-array is a rectangular sub-array.

10. The array according to claim 8, wherein the array is uniformly spaced.

* * * * *